Dec. 7, 1954  H. A. LEHMAN  2,696,289
LEVELING DEVICE FOR MOBILE LOADERS
Filed July 22, 1953  3 Sheets-Sheet 1
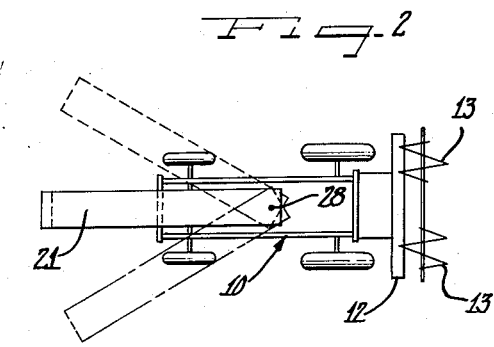
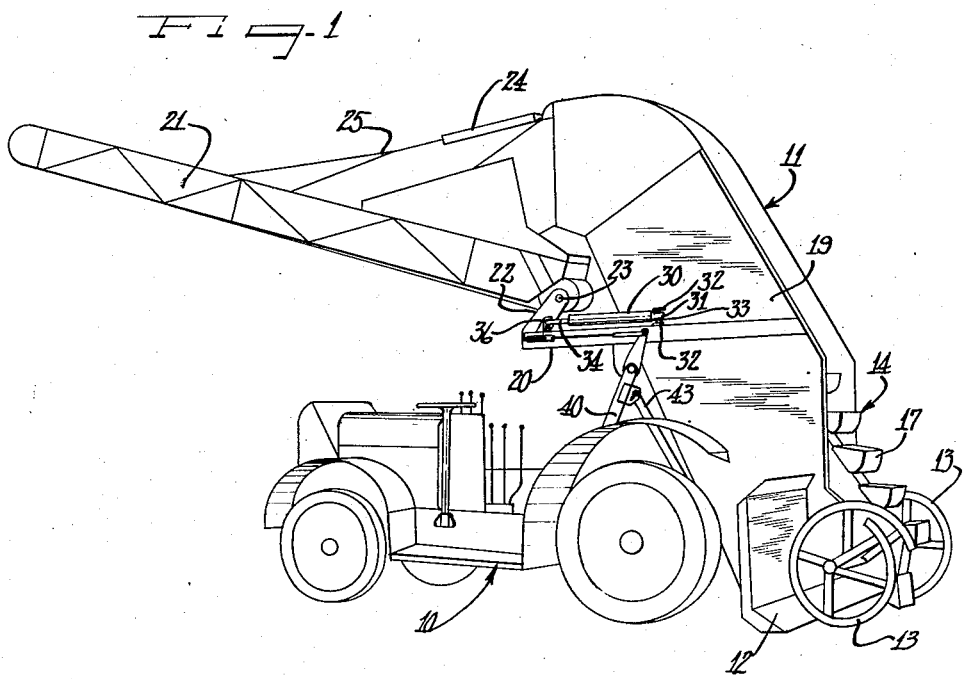
Herbert A. Lehman Dec. 7, 1954      H. A. LEHMAN      2,696,289
LEVELING DEVICE FOR MOBILE LOADERS
Filed July 22, 1953      3 Sheets-Sheet 2
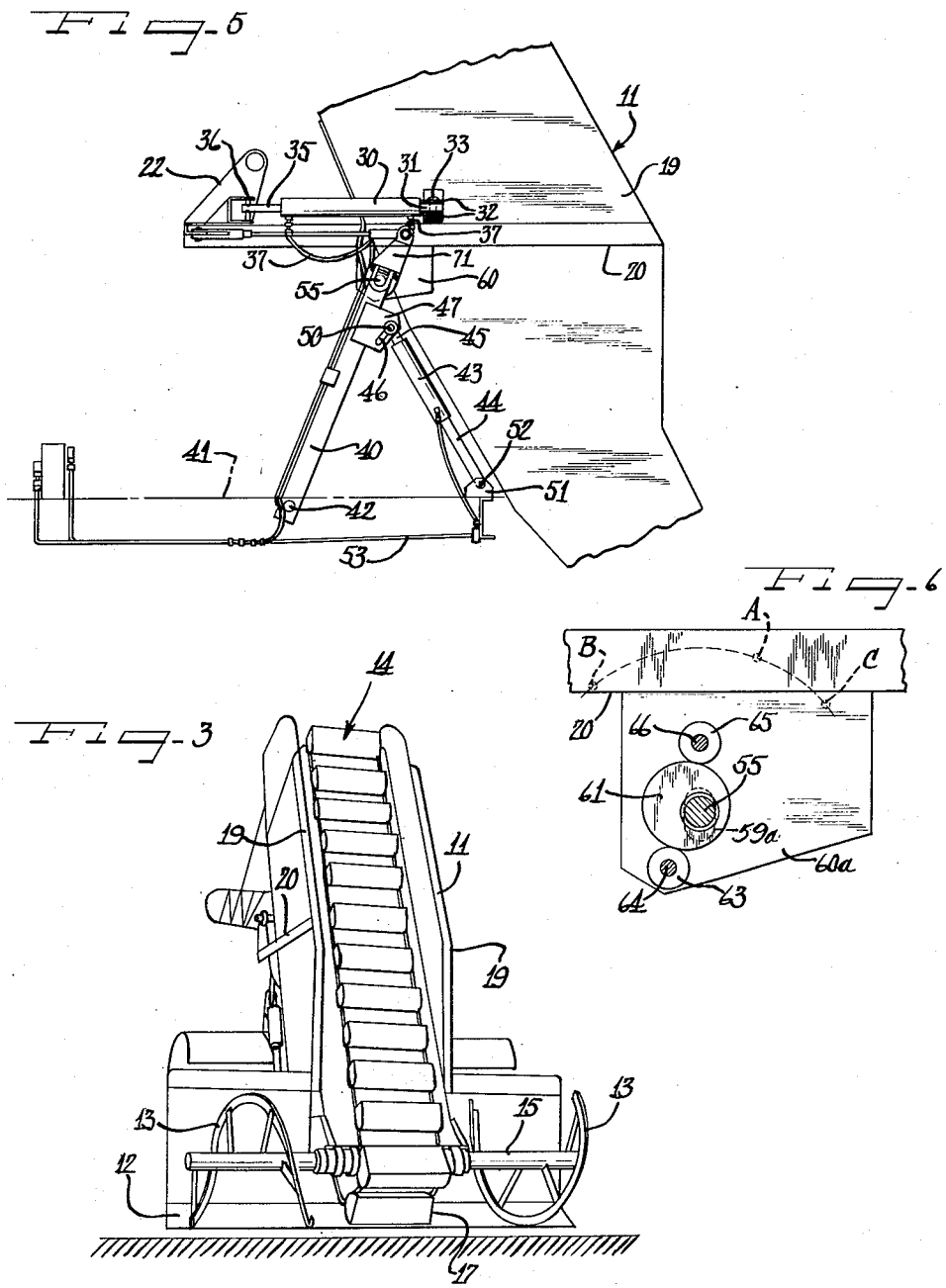
Inventor
Herbert A. Lehman Dec. 7, 1954
H. A. LEHMAN
2,696,289
LEVELING DEVICE FOR MOBILE LOADERS
Filed July 22, 1953
3 Sheets-Sheet 3
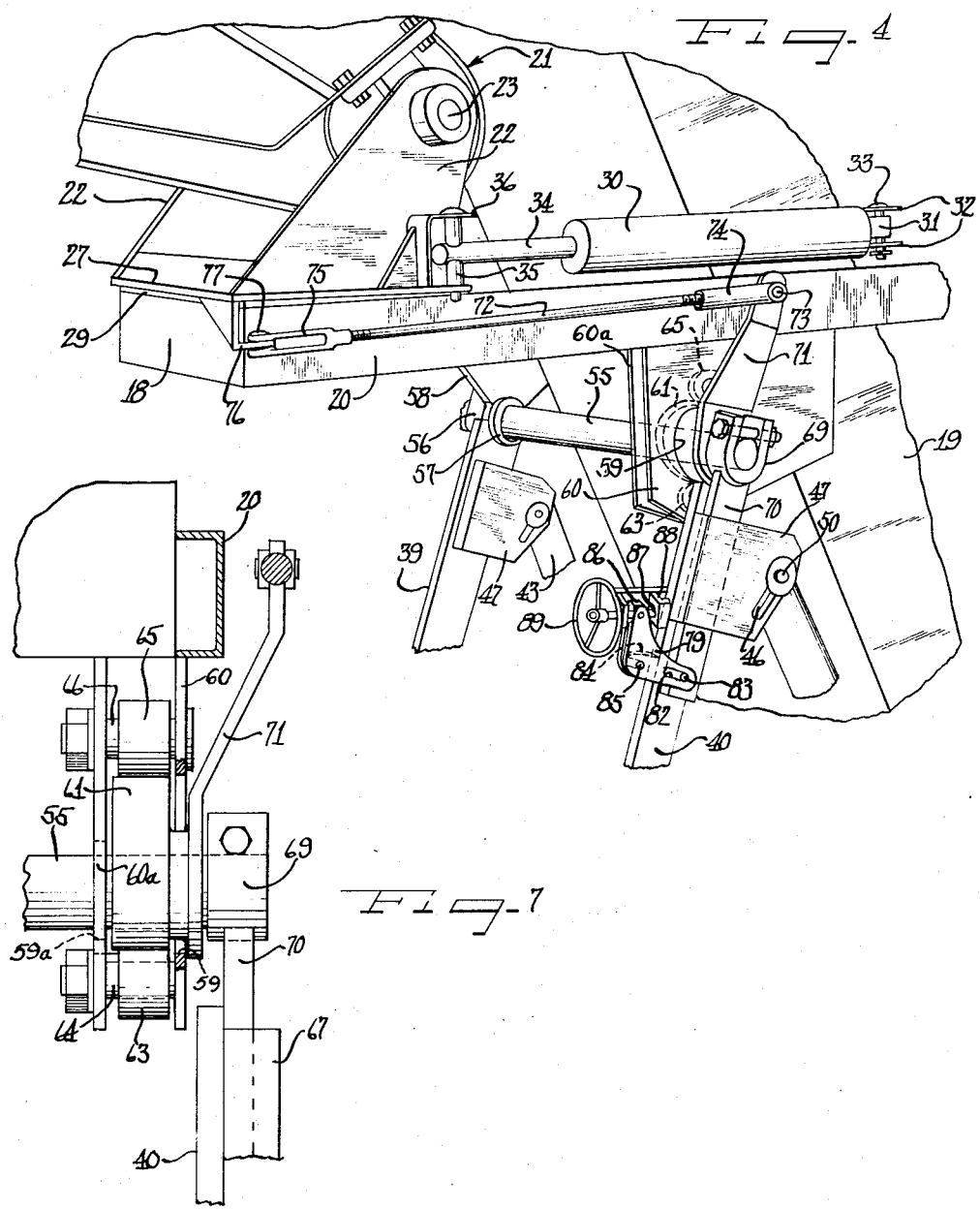
Inventor
Herbert A. Lehman

— —

United States Patent Office 2,696,289
Patented Dec. 7, 1954

2,696,289

LEVELING DEVICE FOR MOBILE LOADERS

Herbert A. Lehman, Aurora, Ill., assignor to Barber-Greene Company, Aurora, Ill., a corporation of Illinois Application July 22, 1953, Serial No. 369,582

15 Claims. (Cl. 198—9)

This invention relates to improvements in a leveling device for mobile loaders and more particularly relates to a device for maintaining the pick-up end of the loader boom level when the material discharge conveyor of the loader is in a laterally extended position with respect to the boom.

A principal object of my invention is to improve upon boom type loaders for snow, coal, aggregate and the like, having a swinging discharge conveyor mounted on and extending from the loader boom by maintaining the receiving end of the boom generally parallel with the roadway, regardless of the position of the swingable discharge conveyor with respect to the center line of the boom.

Another object of my invention is to provide a mobile loader having a generally upright material elevating boom at the forward end of a mobile frame therefor, with a scraper extending across the lower end of the boom, together with a laterally swingable discharge conveyor supported on and extending from the boom adjacent the upper end thereof and having operative connection with the boom support, for raising or lowering one side of the boom as the discharge conveyor is swung to one side or the other of the center line thereof, to maintain the scraper generally parallel to the ground in all laterally extending positions of the discharge conveyor with respect to the boom and to prevent the scraper from riding up over the aggregate.

A still further object of my invention is to provide a bucket loader having a generally upright boom at the forward end of a mobile truck, a bucket line extending upwardly along the boom, pick up means extending transversely of the boom, together with a laterally swingable discharge conveyor mounted on the boom adjacent the upper end thereof in cascade relation with respect thereto, and cam means supporting one side of the boom on the truck with an operative connection from the discharge conveyor to the cam means, for maintaining the pick-up means generally level with the ground regardless of the laterally extended position of the boom with respect to the truck.

Still another object of my invention is to provide a mobile bucket loader having a generally upright inclined material elevating boom with a scraper and pick-up spiral extending across the forward end thereof and a discharge conveyor mounted thereon in material receiving relation with respect to the bucket line, for pivotal movement with respect thereto about a vertical axis and having cam means and a crank and link connection between the discharge conveyor and cam means for varying the angle of the boom with respect to the support therefore during lateral swinging movement of the discharge conveyor, to raise or depress one side of the boom and scraper dependent upon the direction of movement of the discharge conveyor, together with manually operable means varying the angular relation of the boom and pick-up means with respect to the ground, independently of the cam means.

These and other objects of my invention will appear from time to time as the following specification proceeds and reference to the accompanying drawing wherein;

Figure 1 is a perspective view of a bucket loader constructed in accordance with my invention looking generally from the forward to the rear end thereof;

Figure 2 is a diagrammatic plan view of the loader shown in Figure 1 illustrating the laterally extending positions of the discharge conveyor with respect to the supporting truck therefor;

Figure 3 is a front end perspective view of the bucket loader shown in Figure 1;

Figure 4 is a perspective view looking from the rear toward the forward end of the machine and illustrating the automatic leveling device of my invention;

Figure 5 is a fragmentary view in side elevation, showing the boom support and swinging means for the discharge conveyor;

Figure 6 is an enlarged detail fragmentary sectional view illustrating in detail the eccentric cam support for one side of the loading boom; and Figure 7 is an enlarged detail fragmentary sectional view showing certain other details of the eccentric support not shown in Figures 4 and 6.

In the embodiment of my invention illustrated in the drawings, I have shown in Figures 1, 2 and 3, a loader of a continuous bucket type, mounted on a self propelled truck 10, and including a generally upright inclined material elevating boom 11 carried at the forward end of the truck and extending transversely thereof and having a ground engaging scraper 12 extending across the lower forward end of the boom 11. The scraper 12 serves to scrape the material to be loaded, such as aggregate, coal, snow and the like, along the ground and confine it to the path of loading spirals 13, extending transversely of and on each side of a bucket line 14. The spirals 13, 13 are mounted on and are rotatably driven from a transverse shaft 15 which also forms a direction changing device for buckets 17, 17 of the bucket line 14.

The buckets 17, 17 and spirals are power driven in a well known manner (not shown) and the boom 11, the bucket line 14, scraper 12 and spirals 13, 13 are well known to those skilled in the art, so need not herein be described further except to point out that the boom 11 has two parallel spaced side plates 19, 19 extending angularly upwardly and rearwardly from the scraper 12 within the limits of the truck 10 and having two support beams 20, 20 extending therealong intermediate the ends thereof and rearwardly therefrom. The beams 20, 20 are shown as being connected together at their rear ends by a plate 18, and have a plate 29 extending along the top thereof to form a platform for a laterally swingable discharge conveyor 21. The conveyor 21 is mounted on its plate 29 in material receiving relation with respect to the bucket line 14 for lateral swinging movement with respect thereto about the axis of a vertical pivot pin indicated generally by reference character 28 in Figure 2.

The discharge conveyor 21 may be a belt conveyor, or any other well known form of conveyor suitable for conveying loose material and is shown as being transversely pivoted on two laterally spaced parallel upright support brackets 22, 22 on a front direction changing idler shaft 23, for the conveyor.

The discharge conveyor 21 is shown as being maintained in the desired position of elevation with respect to the beams 20 and the boom 11 by means of a cylinder and piston or ram 24, connected to the rear end portion of the boom 11 at one of its ends, and connected with the conveyor frame 21 through a flexible connecting yoke 25, which may be made from chains, guy wires and the like. The details of the ram 24 and connection from said ram to the discharge end of the conveyor 21 need not be herein shown or described further since they form no part of my present invention.

The upright support brackets 22, 22 are shown as being mounted on and extending upwardly along opposite sides of a plate 27, pivotally supported on the beams 20, 20 on the plate 29 for movement with respect thereto about the axis of the vertical pin 28 (see Figure 2).

A cylinder or ram 30 is provided to swing the discharge conveyor 21 about the axis of the vertical pin 28. As herein shown the cylinder 30 has an ear 31 extending from the head end thereof and pivotally mounted between two spaced ears 32, 32 on a pivot pin 33. The ears 32, 32 are shown as extending laterally from a side plate 19 of the boom 11. A piston rod 34 extensible from the piston rod end of the cylinder 30 is shown as being connected with plate 27, to laterally swing the same, by means of a pivot pin 35, extending through the end of said piston rod. The pivot pin 35 is shown as being mounted at its upper end in a bracket member 36 extending upwardly from the plate 27 and at its lower end in the plate 27. Fluid pressure lines 37, 37 are shown in Figure 5 as being connected with the head and piston rod ends of the cylinder 30 to admit fluid under pressure to either end thereof under the control of suitable valves (not shown) to swing the discharge conveyor 21 into the desired laterally extended position with respect to the boom 11.

The boom 11 is pivotally supported on the truck 10 just beneath the beams 20, 20 on two spaced upright support arms 39 and 40 pivotally mounted on side frame members 41, 41 for the truck 10 on pivot pins 42. Each support arm 39 and 40 is maintained in the desired upright position by means of a separate hydraulic ram or cylinder 43, having a piston rod 44 extensible therefrom. As shown in Figure 5, the right hand cylinder 43 has an ear 45 projecting upwardly from the head end thereof which is slidably and pivotally connected to a slot 46 in a plate 47 on a pivot pin 50. The plate 47 is shown as being secured to and extending forwardly from the upright arm 40. The opposite cylinder 43 is pivoted to a similar plate 47 extending forwardly from the opposite upright support arm 39. The piston rod 44 is shown as being pivotally connected at its lower end to an ear 51 on a pivot pin 52. The ear 51 extends upwardly from the side frame member 41 adjacent the forward end thereof. Pressure lines 53 are shown as being provided to supply fluid under pressure to the piston rod ends of the cylinders 43, 43 under the control of suitable valves (not shown) to pivot the support arms 39 and 40 in a direction to raise the boom 11. The boom may be lowered by the release of the fluid under pressure from the piston rod ends of the cylinders 43, the weight of the boom displacing the fluid from said cylinders back to tank, and the fluid in said cylinders cushioning lowering movement of said boom.

The boom 11 is shown as being pivotally supported on the upper ends of the support arms 39 and 40 on a transverse boom pivot shaft 55. One end of the boom pivot shaft 55 is shown as loosely extending through an upwardly opening yoke 56 secured to the upper end of the arm 39. The pivot shaft 55 is shown as supporting the side of the boom adjacent the arm 39 as by a collar 57, which may be welded or otherwise secured to a bracket 58 extending downwardly from the beam 20 and side plate 19. The fit between said collar and shaft is a loose fit to accommodate tilting movement of said boom about said shaft.

The opposite end of the shaft 55 is shown as extending through registering openings 59 and 59a in two parallel spaced brackets or plates 60, 60a respectively, depending from the bottom of the beam 20 and extending rearwardly from the right hand side plate 19. The shaft 55 is shown as having an eccentric cam 61 rotatably journaled thereon in the space between the side plates 60, 60a. The eccentric cam 61 is shown as resting on a roller 63 rotatably mounted between the side plates 60, 60a on a pivot pin 64. The eccentric 61 also supports an opposed roller 65, pivotally mounted between the side plates 60, 60a on a pivot pin 66. The opening 59 in the plate 60 is sufficiently large to accommodate assembly of the eccentric cam 61 on the shaft 55.

The opening 59a is elongated to engage opposite sides of the shaft 55 and confine movement of the boom in a single plane, shown as being generally vertical. The shaft 55 is also supported within an upwardly opening yoke 69, welded or otherwise secured to the upper end of a slide 70, extending parallel to the support arm 40 and guided for rectilinear movement with respect thereto within the right hand plate 47. The slide 70 forms a manually operable means for tilting the shaft 55 and boom 11, as will hereinafter be more fully described as this specification proceeds.

Rotatably mounted on the shaft 55 outwardly of the outer plate 60 and inwardly of the yoke 69 is a crank arm 71. The crank arm 71 may be welded or otherwise secured to cam 61 and extends angularly upwardly from the shaft 55 in a general direction toward the boom 11. A link 72 is pivotally connected to the upper end of said crank arm on a pivot pin 73 extending through a yoke 74, threaded on one end of the link 72 and extending along opposite sides of the crank arm 71. The opposite end of the link 72 is shown as having a yoke 75 threaded thereon and as extending along opposite sides of a bracket 76 depending from and extending outwardly and forwardly of the rear end portion of the plate 27. A pivot pin 77 is provided to pivotally connect the yoke 75 to the bracket 76. The bracket 76 is spaced outwardly from the beam 20 a distance sufficient to accommodate lateral movement of the discharge conveyor 21 from the position shown by the dashed line in Figure 2 to the dot and dash position shown in this figure.

When the discharge conveyor 21 is in an aligned position with respect to the truck 10 and boom 11, the crank arm 71 will be in the position indicated by reference character A in Figure 6. As the discharge conveyor moves toward the far side or left hand side of the machine when looking from the rear toward the forward end of the machine, the link 72 will pivot the crank arm 71 in a counterclockwise direction toward position B shown in Figure 6, this position being attained in one extreme position of adjustment of the conveyor 21. As the conveyor moves into this position the crank arm 70 moving in a counterclockwise direction will pivot the cam 61 in the same direction. This will force the roller 63 downwardly and in turn angularly move the boom 11, scraper 12 and gathering spirals 13, 13 about the support arm 39 downwardly on the rear or right hand side of the machine, when looking from the rear toward the forward end thereof. This angular movement of the boom 11 will thus counteract the upward lift normally encountered by the uneven weight distribution of the overhanging discharge conveyor 21.

When the discharge conveyor 21 swings toward the near or right hand side of the machine when looking at the machine from the rear end thereof, the crank arm 70 will move in a clockwise direction toward position C shown in Figure 6 and turn the eccentric cam 61 in the same direction. This will force the roller 65 upwardly and thus elevate the right hand side of the boom and depress the left hand side thereof, to maintain the scraper 12 generally parallel to the ground and counteract the tendency of the overhanging weight of the discharge conveyor to raise the left hand end of the scraper 12 upwardly and tilt said scraper with respect to the roadway.

The slide 70 slidably guided in the near or right hand plate 47 is shown as being vertically moved and held in position by spaced bell cranks 79, 79 connected to said slide by a pivot pin 83 movable along the slots 82 formed in said bell cranks. The pivot pin 83 extends through a slot (not shown) extending along the arm 40. The bell cranks 79 are pivotally mounted intermediate their ends on the support arm 40 on a bracket 84 on a pivot pin 85. The bracket 84 is shown as extending between said bell cranks. The other arms of the bell cranks, 79, 79 are shown as having a nut 86 trunnioned therebetween. The nut 86 is threaded on a threaded shaft 87 rotatably mounted on a bracket member 88 extending rearwardly from the support arm 40. A hand wheel 89 secured to the outer end of the threaded shaft 87 is provided to turn the same. Upon turning of the hand wheel 89, the bell cranks 79, 79 manually tilt the shaft 55 and boom 11 as well as the scraper 12 and feeding spirals 13 as desired. The slide 70 thus affords a manual means for initially leveling the boom 11 and scraper 12 and for maintaining said boom and scraper level independently of the eccentric 61 and rollers 63 and 65.

It may be seen from the foregoing that a simple, practical and efficient supporting means has been provided for depressing one side of the boom and scraper as the overhanging weight of the discharge conveyor tends to raise said boom and scraper, to counteract the tendency of the overhanging weight of the discharge conveyor to tilt the scraper 12 out of parallelism with respect to the ground and thus overcoming the tendency of a tilted scraper to climb up along the material being loaded.

It may further be seen that tilting of the boom and scraper is automatically effected in accordance with lateral swinging movement of the discharge conveyor, by a simplified link and cam arrangement operated by the discharge conveyor to tilt the support shaft for the boom in one direction or another as the discharge conveyor swings laterally.

It will be understood that various modifications and variations of the present invention may be effected with-

I claim as my invention:

1. In a mobile loader having a transverse scraper with an inclined elevating conveyor extending upwardly therefrom, a vertically pivoted discharge conveyor supported on said elevating conveyor in cascade relation with respect thereto, means swinging said discharge conveyor laterally with respect to said elevating conveyor, and means connected with said discharge conveyor and operated by swinging movement thereof, for depressing one side of said elevating conveyor and scraper upon swinging movement of said discharge conveyor to project from the opposite side of said elevating conveyor.

2. In a mobile loader having an inclined elevating conveyor with a transverse scraper extending across the forward end thereof, a vertically pivoted discharge conveyor supported on said inclined elevating conveyor in material receiving relation with respect thereto, power means for swinging said discharge conveyor laterally with respect to said elevating conveyor, a transverse shaft forming a support for said inclined elevating conveyor and said discharge conveyor, means supporting said shaft adjacent opposite ends thereof, cam means adjacent one end of said shaft operable to tilt said elevating conveyor and scraper about the opposite end of said shaft, and crank and link means connected between said discharge conveyor and cam means for operating said cam means to tilt the elevating conveyor to depress one side of said scraper upon lateral swinging movement of said discharge conveyor beyond the opposite side of said elevating conveyor.

3. In a loader for loading loose materials, a self-propelled frame, an inclined boom carried thereby at the forward end thereof, a transverse ground engaging scraper at the forward end of said boom and secured thereto, an elevating conveyor movable along said boom, a discharge conveyor mounted on said boom in material receiving relation with respect to said elevating conveyor for lateral swinging movement with respect thereto, power means for laterally swinging said discharge conveyor, and means reacting against said frame and boom for depressing one side of said boom upon lateral swinging movement of said discharge conveyor to overhang the opposite side of said boom.

4. In a loader for loading loose material, a self-propelled frame, a boom carried thereby at the forward end thereof, a transverse ground engaging scraper on said boom at the forward end thereof, an elevating conveyor guided for movement along said boom, a discharge conveyor mounted on said boom in material receiving relation with respect to said elevating conveyor and extending rearwardly therefrom, means for laterally moving said discharge conveyor to overhang opposite sides of said frame, means supporting said boom on said frame, and means actuated by lateral swinging movement of said discharge conveyor and reacting against the boom and frame at the point of support of said boom on said frame for depressing one side of said boom and scraper upon swinging movement of said elevating conveyor beyon the opposite side of said frame, comprising a cam having supporting engagement with one side of said boom, and crank and link means connecting said cam with said discharge conveyor to pivot said cam to depress one side of said boom upon pivotal movement of said discharge conveyor to overhang the opposite side of said frame.

5. In a loader for loading loose materials, a self-propelled main frame, a boom carried thereby at the forward end thereof, a transverse ground engaging scraper carried by said boom at the forward end thereof and extending transversely of said frame, conveying means guided for movement along said boom, a discharge conveyor vertically pivoted at the rear end of said boom in cascade relation with respect to said conveying means, means for laterally swinging said discharge conveyor, a transverse shaft supporting said boom, means supporting said shaft on said frame adjacent its opposite ends, a movable member associated with said shaft, and a supporting connection between said movable member and one side of said boom and operatively connected with said discharge conveyor and moved thereby by lateral swinging movement thereof to depress one side of said boom and scraper upon swinging movement of said discharge conveyor to the opposite side thereof.

6. In a loader for loose materials, a self-propelled main frame, a boom carried thereby at the forward end thereof, material gathering means at the forward end of said boom, an inclined elevating conveyor extending upwardly along said boom in material receiving relation with respect to said gathering means, a discharge conveyor extending rearwardly from said boom and pivotally mounted thereon adjacent the upper end thereof in material receiving relation with respect to said elevating conveyor, means pivoting said discharge conveyor to extend laterally beyond either side of said main frame, means mounting said boom on said main frame including a plurality of laterally spaced upright arms extending upwardly from said main frame, a transverse shaft supported thereon and having rocking supporting connection with one side of said boom, a movable supporting connection between said shaft and boom and at the opposite side of said boom comprising a rotatably movable member on said shaft having supporting connection with said boom, and a crank and link connecting said discharge conveyor with said movable member, for moving the same upon lateral swinging movement of said discharge conveyor to tilt said boom about the opposite end of said shaft.

7. In a loader for loose materials, a wheel mounted self-propelled truck having a frame, a boom carried by said frame at the forward end of said truck and having transversely extending material gathering means at the forward end thereof, an elevating conveyor guided for movement along said boom from a position in material receiving relation with respect to said gathering means to a discharge position at the upper end of said boom, a rearwardly extending platform on said boom, adjacent the upper end thereof, a discharge conveyor pivotally mounted on said platform in material receiving relation with respect to said elevating conveyor and for lateral movement beyond either side of said truck, power means for laterally moving said discharge conveyor, the support means for said boom on said truck comprising two spaced upright support members mounted on said main frame, a transverse shaft supported on said support members and having rocking supporting connection with one side of said boom, and a movable supporting connection between said shaft and the other side of said boom comprising a rotatable cam on said shaft, a bracket depending from said boom and having two vertically spaced rollers thereon engaging said cam on opposite sides thereof, and supporting the adjacent end of said boom on said cam, a crank operatively connected with said cam to pivot the same, and a link connected from said crank to said discharge conveyor to pivot said cam upon lateral swinging movement of said discharge conveyor, to lower one side of said boom and material gathering means upon the projection of said elevating conveyor beyond the opposite side thereof.

8. In a loader for loose materials, a wheel mounted self propelled truck having a frame, a boom carried by said frame at the forward end thereof, an elevating conveyor guided for movement along said boom, a rearwardly extending platform on said boom adjacent the upper end thereof, a discharge conveyor pivotally mounted on said platform in material receiving relation with respect to said elevating conveyor, and movable laterally beyond either side of said truck, power means for laterally pivoting said discharge conveyor, support means for said boom on said truck comprising two spaced upright support members mounted on said main frame, a transverse shaft supported on said support members and having rocking supporting connection with one side of said boom, a movable supporting connection between the other end of said transverse shaft and the other side of said boom comprising a rotatable cam on said shaft, a bracket depending from said boom and having two vertically spaced rollers thereon, engaging said cam on opposite sides thereof, a crank operatively connected with said cam to pivot the same, a link connected from said crank to said discharge conveyor to pivot said cam upon lateral swinging movement of said discharge conveyor to lower one side of said boom and material gathering means upon projection of said discharge conveyor beyond the opposite side thereof, and manually operable means for tilting said shaft and boom independently of said cam and crank comprising a slide slidably mounted on said support arm adjacent said cam and having supporting engagement with the adjacent end of said shaft, and manually operable means for vertically moving said slide along said arm and for holding said slide in fixed relation with respect to said arm.

9. In a mobile loader for picking up and loading loose material from the ground, a self propelled truck having a main frame, two laterally spaced support arms extending upwardly from said frame adjacent the forward end thereof, a transverse shaft supported on said arms, a generally upright boom mounted on said shaft for pivotal movement about the axis thereof and for transverse rocking movement with respect thereto, a scraper extending across the forward end of said boom and connected thereto, an inclined elevating conveyor in material receiving relation with respect to said scraper and orbitally guided to progress material upwardly along said boom, a platform supported on said boom adjacent the upper end thereof and extending rearwardly therefrom, a discharge conveyor vertically pivoted on said platform in material receiving relation with respect to said elevating conveyor, a cylinder and piston connected between said boom and discharge conveyor for laterally swinging said discharge conveyor, and means for tilting said shaft and boom about one of said arms comprising a support bracket extending from said boom along the upper and lower sides of said shaft, an eccentric cam on said shaft, two spaced rollers on said bracket engaging said cam above and below said shaft and supporting one side of said boom on said shaft, a crank on said shaft for pivotally moving said cam, and a link connecting said crank with said discharge conveyor, for pivoting said crank upon lateral swinging movement of said discharge conveyor to depress one side of said boom and scraper upon swinging movement of said elevating conveyor to overhang the opposite side of said truck and boom.

10. In a mobile loader for picking up and loading loose material from the ground, a self propelled truck having a main frame, two laterally spaced support arms extending upwardly from said frame adjacent the forward end thereof, a transverse shaft supported on said arms, a generally upright boom mounted on said shaft for pivotal movement about the axis thereof and for transverse rocking movement with respect thereto, a scraper extending across the forward end of said boom and connected thereto, an inclined elevating conveyor in material receiving relation with respect to said scraper and orbitally guided to progress material upwardly along said boom, a platform supported on said boom adjacent the upper end thereof and extending rearwardly therefrom, a discharge conveyor vertically pivoted on said platform in material receiving relation with respect to said elevating conveyor, a cylinder and piston connected between said boom and discharge conveyor for laterally swinging discharge conveyor, and means for tilting said shaft and boom about either of said arms comprising a support bracket extending from said boom along the upper and lower sides of said shaft, an eccentric cam on said shaft, two spaced rollers on said bracket engaging said cam above and below said shaft and supporting one side of said boom on said shaft, a crank on said shaft for pivotally moving said cam, and a link connecting said crank with said discharge conveyor, for pivoting said crank upon lateral swinging movement of said discharge conveyor to depress one side of said boom and scraper upon swinging movement of said elevating conveyor to overhang the opposite side of said truck and boom, and manual means for tilting said shaft about one of said support arms comprising a slide slidably movable on one of said arms and having supporting engagement with said shaft, means manually operable to move said slide vertically along said arm and hold said slide in fixed relation with respect thereto, and a hand wheel for operating said manually operable means.

11. In a mobile loader for loose material having a self propelled main frame, an upright boom at the forward end of said main frame, having a scraper at the lower end thereof extending transversely of said main frame, and transverse material gathering means for progressing material inwardly toward the center of said boom, an endless bucket line carried by said boom in material receiving relation with respect to said gathering means for elevating material to the upper end of said boom, a platform on said boom adjacent the upper end thereof and extending rearwardly therefrom, a discharge conveyor pivotally mounted on said platform in material receiving relation with respect to said bucket line, for lateral swinging movement with respect to said main frame and boom about a vertical axis, means supporting said boom on said main frame comprising two laterally spaced upright arms extending upwardly from said main frame, a transverse shaft mounted on the upper ends of said arms and having one side of said boom rockingly supported thereon, and means adjacent the opposite end of said shaft for movably supporting said boom thereon to tilt about the first mentioned end of said shaft comprising a cam and roller means supporting the opposite end of said boom on said shaft and crank and link means connecting said discharge conveyor with said shaft to pivot said cam means and tilt said boom about the other of said arms dependent upon the direction of lateral swinging movement of said discharge conveyor.

12. In a mobile loader for loose material having a self propelled main frame, an upright boom at the forward end of said main frame having a scraper at the lower end thereof extending transversely of said main frame, and transverse material gathering means for progressing material inwardly toward the center of said boom, an endless bucket line carried by said boom in material reeciving relation with respect to said gathering means for elevating material to the upper end of said boom, a platform on said boom adjacent the upper end thereof and extending rearwardly therefrom, a discharge conveyor pivotally mounted on said platform in material receiving relation with respect to said bucket line and for lateral swinging movement with respect to said main frame and boom about a vertical axis, means supporting said boom on said main frame comprising two laterally spaced upright arms extending upwardly from said main frame, a transverse shaft mounted on the upper ends of said arms and having one side of said boom rockingly supported thereon adjacent one end of said shaft, and means adjacent the opposite end of said shaft for movably supporting said boom thereon to tilt about its rocking support on said shaft comprising a cam on said shaft, two vertically spaced rollers on said boom engaging said cam on opposite sides thereof and supporting a side of said boom on said shaft, a crank on said shaft for pivotally moving said cam, and a link connecting said crank with said discharge conveyor for pivoting said cam and tilting said boom to depress one side of said boom upon movement of discharge conveyor to project laterally beyond the opposite side thereof.

13. In a mobile loader for loose material having a self propelled main frame, an upright boom at the forward end of said main frame having a scraper at the lower end thereof extending transversely of said main frame, and transverse material gathering means for progressing material inwardly toward the center of said boom, an endless bucket line carried by said boom in material receiving relation with respect to said gathering means for elevating material to the upper end of said boom, a platform on said boom adjacent the upper end thereof and extending rearwardly therefrom, a discharge conveyor pivotally mounted on said platform in material receiving relation with respect to said bucket line for lateral swinging movement with respect to said main frame and boom about a vertical axis, means supporting said boom on said main frame comprising two laterally spaced upright arms extending upwardly from said main frame, a transverse shaft mounted on the upper ends of said arms and having one side of said boom rockingly supported thereon, and means adjacent the opposite end of said shaft for movably supporting said boom thereon to tilt about the first mentioned end of said shaft comprising a cam and manually operable means for tilting said boom and scraper independently of said cam comprising a slide slidably supported on one of said arms and having supporting engagement with said shaft, a bell crank operatively connected with said slide, and a threaded member and nut for pivoting said bell crank to move said slide along said shaft to hold said slide in fixed relation with respect thereto, and means for manually operating said threaded member.

14. In a mobile loader for picking and loading loose material from the ground, a self propelled truck having a main frame, an upright boom at the forward end of said main frame and extending vertically along the forward end thereof and having a bucket elevator orbitally driven thereabout from one end thereof to the other, means adjustably supporting said boom on said main frame comprising two spaced support arms transversely pivoted to said main frame adjacent the forward end thereof, a transverse shaft supported on said links, and having said boom rockingly supported thereon, cylinder and piston means connected between said main frame and support arms, a transverse scraper at the lower end of said boom extending laterally therefrom to either side thereof, a rotatable feeder extending along said scraper for progressing loose material toward the center of said boom to said bucket elevator, a platform extending rearwardly from said boom adjacent the upper end thereof, a discharge conveyor pivotally mounted on said platform in material receiving relation with respect to said bucket elevator, for lateral swinging movement with respect thereto, and a supporting connection between said shaft and one side of said boom for tilting said boom about its opposite side to depress one end of said scraper when said discharge conveyor is swung laterally beyond the opposite side of said truck and maintain said scraper level with respect to the ground comprising an eccentric cam on said shaft, a crank for pivotally moving said cam, a link connecting said crank with said discharge conveyor to pivot said cam, and a supporting connection for said boom on said eccentric comprising two parallel spaced plates extending downwardly from said boom along opposite sides of said cam and two spaced rollers mounted between said plates, one engaging the upper side of said cam and the other engaging the lower side of said cam, said rollers supporting said boom on said cam and tilting said boom upon pivotal movement of said eccentric.

15. In a mobile loader for picking up and loading loose material from the ground, a self propelled truck having a main frame, an upright boom at the forward end of said main frame and extending vertically along the forward end thereof and having a bucket elevator orbitally driven thereabout from one end thereof to the other, means adjustably supporting said boom on said main frame comprising two spaced support arms transversely pivoted to said main frame adjacent the forward end thereof, a transverse shaft supported on said links, and having said boom rockingly supported thereon, cylinder and piston means connected between said main frame and support arms, a transverse scraper at the lower end of said boom extending laterally therefrom to either side thereof, a rotatable feeder extending along said scraper for progressing loose material toward the center of said boom to said bucket elevator, a platform extending rearwardly from said boom adjacent the upper end thereof, a discharge conveyor pivotally mounted on said platform in material receiving relation with respect to said bucket elevator, for lateral swinging movement with respect thereto, and a supporting connection between said shaft and one side of said boom for tilting said boom about its opposite side to depress one end of said scraper when said discharge conveyor is swung laterally beyond the opposite side of said truck and maintain said scraper level with respect to the ground comprising an eccentric cam on said shaft, a crank for pivotally moving said cam, a link connecting said crank with said discharge conveyor to pivot said cam, and a supporting connection for said boom on said eccentric comprising two parallel spaced plates extending downwardly from said boom along opposite sides of said cam and two spaced rollers mounted between said plates, one engaging the upper side of said cam and the other engaging the lower side of said cam, and means for tilting said shaft to tilt said boom independently of said cam including a slide guided on said support arm adjacent said cam and having supporting engagement with said end of said shaft, and manually operable means for moving said slide along said support arm.

No references cited.